United States Patent
Halim et al.

(10) Patent No.: US 9,735,661 B2
(45) Date of Patent: Aug. 15, 2017

(54) MIXED-MODE POWER FACTOR CORRECTION

(71) Applicant: Infineon Technologies AG, Neubiberg (DE)

(72) Inventors: Andriyanto Halim, Singapore (SG); Yew Onn Wong, Singapore (SG); Teng Long Neo, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 294 days.

(21) Appl. No.: 14/466,789

(22) Filed: Aug. 22, 2014

(65) Prior Publication Data

US 2016/0056702 A1 Feb. 25, 2016

(51) Int. Cl.
*H02M 1/00* (2006.01)
*H02M 1/12* (2006.01)
*H02M 7/04* (2006.01)
*H02M 1/42* (2007.01)
*H02M 3/156* (2006.01)

(52) U.S. Cl.
CPC .............. *H02M 1/00* (2013.01); *H02M 1/12* (2013.01); *H02M 1/4225* (2013.01); *H02M 3/156* (2013.01); *H02M 7/04* (2013.01); *H02M 2001/0003* (2013.01); *Y02B 70/126* (2013.01)

(58) Field of Classification Search
None
See application file for complete search history.

(56) References Cited

U.S. PATENT DOCUMENTS

| | | | | |
|---|---|---|---|---|
| 7,376,182 B2* | 5/2008 | Kris | .......................... | H03K 7/08 341/53 |
| 8,183,841 B2* | 5/2012 | Osburn | ................. | H02M 3/158 323/272 |
| 2006/0043954 A1* | 3/2006 | Markowski | .......... | H02M 3/157 323/283 |
| 2013/0336010 A1* | 12/2013 | Saxena | ................... | H02M 1/12 363/13 |
| 2014/0085943 A1* | 3/2014 | Lin | ................... | H02M 3/33507 363/21.17 |

OTHER PUBLICATIONS

Abdel-Rahman, S., "CCM PFC Boost Converter Design," Infineon Technologies North America Corp (IFNA) Design Note DN Jan. 2013, V1.0, Jan. 2013, 18 pp.
"Taking PFC to the Next Level; More Efficient, Easier Design, Scales to Higher Power," Texas Instruments, retrieved from http://www.ti.com/corp/docs/landing/ucc28070/index.htm?DCMP=hpa_pmp_linepower&HQS=Other+OT+pfc-sbd on Aug. 22, 2014, 2 pp.

(Continued)

*Primary Examiner* — Fred E Finch III
*Assistant Examiner* — Monica Mata
(74) *Attorney, Agent, or Firm* — Shumaker & Sieffert, P.A.

(57) ABSTRACT

A controller for controlling a power converter is described. The controller may be configured determine a parameter value associated with the power converter, compare the parameter value to a predefined value, and change the conduction mode of the power converter based on the comparison.

20 Claims, 9 Drawing Sheets

(56) References Cited

OTHER PUBLICATIONS

"Digital Power Interleaved PFC Reference Design," Microchip Technology, Inc., retrieved from http://www.microchip.com/stellent/idcplg?IdcService=SS_GET_PAGE&nodeId=1406&dDocName=en544145 on Aug. 22, 2014, 2 pp.

"Power Management; PWM and Resonant Controller," Texas Instruments, retrieved from http://www.ti.com/paramsearch/docs/parametricsearch.tsp?family=analog&familyId=398&uiTemplateId=NODE_STRY_PGE_T&DCMP=hpa_pmp_linepower&HQS=Other+OT+pwm-sbd on Aug. 22, 2014, 12 pp.

"Section 14, Compare/Capture/PWM (CCP)," Microchip Technology, Inc., retrieved from http://ww1.microchip.com/downloads/en/DeviceDoc/31014a.pdf on Aug. 22, 2014, 18 pp.

\* cited by examiner

MIXED-MODE POWER FACTOR CORRECTION

TECHNICAL FIELD

This disclosure relates to power converters, and more particular, to techniques and circuits associated with mixed-mode power converters.

BACKGROUND

Some circuits may use power converters that receive a power input from a power source and convert the power input to a power output that has a different (e.g., regulated) voltage or current level than the voltage or current level of the power input. The converter outputs the power for powering a component, a circuit, or other electrical device. Switch-based power converters may use half-bridge circuits and signal modulation techniques to regulate the current or voltage level of a power output. In some examples, power converters may use additional feedback control circuits and techniques (e.g., voltage sensing, current sensing, and the like) to improve the accuracy and control of the voltage or current level of the power output. These aforementioned techniques and circuits for improving the accuracy and control of the voltage or current of the power output may decrease overall efficiency of the power converter and/or increase the physical size, complexity, and/or cost of the power converter.

SUMMARY

The disclosure describes techniques and systems for improving efficiency, power factor, and total harmonic distortion (THD) of a power converter. In some examples, the power converter may alternatingly operate in different conduction modes depending upon the load conditions.

In some examples, the disclosure is directed to a controller for controlling a power converter, where the controller is configured to determine a parameter value associated with the power converter, compare the parameter value to a predefined value, and change the conduction mode of the power converter based on the comparison.

In some examples, the disclosure is directed to a method of controlling a power converter, including determining a parameter value associated with the power converter, comparing the parameter value to a predefined value, and changing the conduction mode of the power converter based on the comparison.

In some examples, the disclosure is directed to a system including a power converter that includes a switch, and a controller for controlling the power converter, where the controller is configured to determine a parameter value associated with the power converter, compare the parameter value to a predefined value, and change the conduction mode of the power converter based upon the comparison.

The details of one or more examples are set forth in the accompanying drawings and the description below. Other features, objects, and advantages of the disclosure will be apparent from the description and drawings, and from the claims.

DETAILED DESCRIPTION

Figure 1:
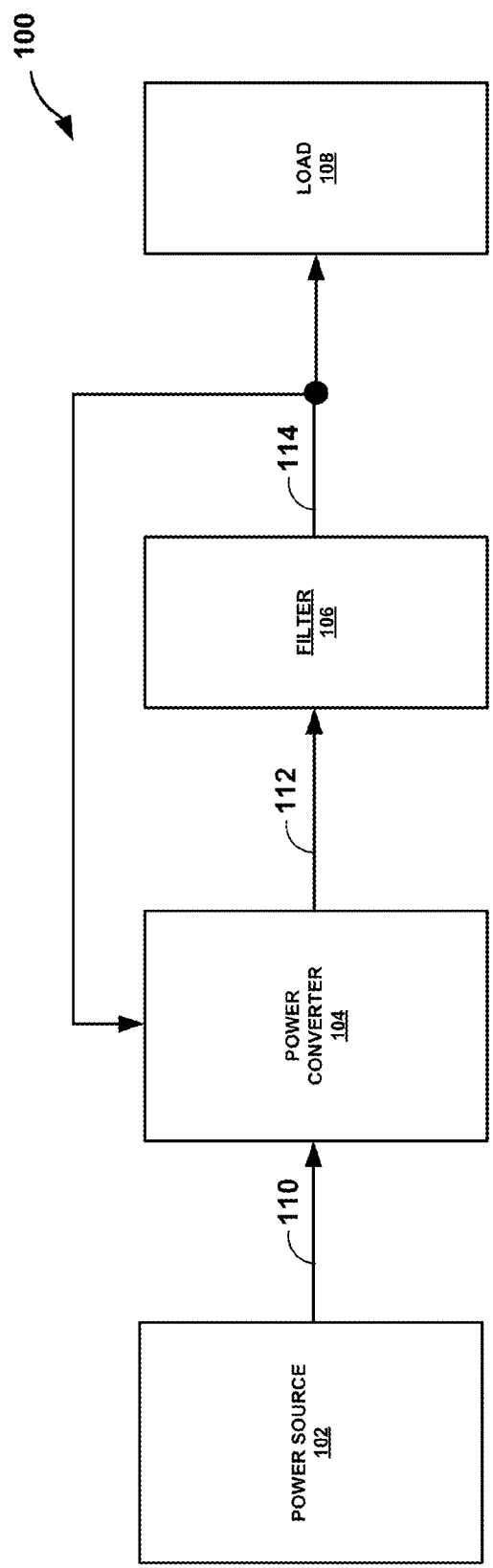
FIG. 1 is a block diagram illustrating an example system for converting power from a power source, in accordance with one or more aspects of this disclosure.

In some applications, a switch-based power converter (hereafter referred to as a "power converter" or simply a "converter") may receive a power input and convert the power input to a power output that has a voltage or current level that is different (e.g., regulated) than the voltage or current level of the power input, for instance, to provide the power output to a filter for powering a load (e.g., a device). As described herein, the term "step-up" refers to a power converter configured to receive an input power signal with a first voltage level (or first current level), and output a power signal with a second voltage level (or current level) that is greater than the first voltage level (or current level). As also described herein, the term "step-down" converter refers to a power converter configured to receive an input power signal with a first voltage level (or current level), and output a power signal with a second voltage level (or current level) that is less than the first voltage level (or current level).

In either case, a power converter may have one or more switches (e.g., MOS power switch transistors based switches, gallium nitride (GaN) based switches, or other types of switch devices) arranged in a power stage configuration (e.g., a single phase, or multi-phase half-bridge configuration, etc.) that the power converter controls, according to one or more modulation techniques, to change the current or voltage level of the power output. A single phase half-bridge may include a high-side switch coupled to a low-side switch at a switching node whereas a multi-phase half-bridge may include multiple high-side switches coupled to multiple low-side switches at a switching node.

A power converter may include one or more gate drivers and control logic to control (e.g., turn-on and turn-off) the one or more switches of the power stage using modulation techniques. The modulation of the switches of a power stage may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. By controlling the switches of a power stage using modulation techniques, a power converter can regulate the current or voltage level of the power being outputted by the power converter. In PFM, the frequency of a pulse train is varied based on the instantaneous amplitude of the modulating signal at sampling intervals.

Some power converters may use feedback circuits and techniques for performing current sensing and/or voltage sensing to obtain information about a current or voltage level of a power output. The power converter may use the information received using feedback circuits and techniques to improve the accuracy of the power output. For example, the power converter may use the feedback information to contain the voltage or current level of a power output within a particular tolerance or threshold window for satisfying the power requirements of a load. Some power converters may use current sensing as one example of feedback circuits and techniques to determine the real-time current level of the power being outputted to a load. If the power converter determines that the current level does not satisfy the power requirements of the load, then the power converter may adjust or change how the power converter controls the power switches in order to adjust or change the current level of the power output until the current level of the power output is contained within the tolerance window and satisfies the current level associated with the power requirements of the load.

The disclosure describes a power converter that may operate in a variety of conduction mode topologies. In some examples, a power converter may operate in a continuous conduction mode (CCM), particularly if the power converter is designed to operate at high loads. In CCM, the inductor current may be continuous (e.g. the current never reaches zero during one switching cycle), the duty cycle (or on-time) may be variable, and the switching frequency may be fixed. In some examples, a power converter operating in CCM at low loads may result in lower efficiency, power factor, and THD, as compared to other topologies. In some examples, a power converter designed to operate at low loads may operate in a discontinuous conduction mode (DCM). In some examples, a power converter operating in DCM may generate a large peak current.

In some examples, a power converter may operate in a critical conduction mode (CRM), particularly if the power converter is designed to operate at low loads. In CRM, the duty cycle may be fixed (or constant) and the switching frequency may be variable. CRM controllers may utilize a zero crossing detector in order to trigger the start of the next switching cycle. In some examples, a power converter operating in CRM may produce a low average output current, as compared to other conduction mode topologies (particularly DCM). In some examples, a power converting operating in CRM at low loads may result in higher efficiency, as compared to other topologies (particularly CCM).

The disclosure describes techniques and systems that may improve efficiency, power factor, and/or total harmonic distortion (THD) of a power converter. In some examples, the power converter may alternatingly operate in different conduction modes depending upon the load conditions.

In some examples, the disclosure is directed to a controller for controlling a power converter, where the controller is configured to determine a parameter value associated with the power converter, compare the parameter value to a predefined value, and change the conduction mode of the power converter based on the comparison.

In some examples, the disclosure is directed to a method of controlling a power converter, including determining a parameter value associated with the power converter, comparing the parameter value to a predefined value, and changing the conduction mode of the power converter based on the comparison.

In some examples, the disclosure is directed to a system including a power converter that includes a switch, and a controller for controlling the power converter, where the controller is configured to determine a parameter value associated with the power converter, compare the parameter value to a predefined value, and change the conduction mode of the power converter based upon the comparison.

FIG. 1 is a block diagram illustrating a system 100 for converting power from power source 102, in accordance with one or more aspects of this disclosure. FIG. 1 shows system 100 as having four separate and distinct components shown as power source 102, power converter 104, filter 106, and load 108, however system 100 may include additional or fewer components. For instance, power source 102, power converter 104, filter 106, and load 108 may be four individual components or may represent a combination of one or more components that provide the functionality of system 100 as described herein.

System 100 may include power source 102 which provides electrical power to load 108. For example, when power source 102 comprises a generator or generators, transformers, batteries, solar panels, or regenerative braking systems, system 100 may include power source 102. In other examples, system 100 may be separate from power source 102. For example, when power source 102 comprises power grids, generators, transformers, external batteries, external solar panels, windmills, hydro-electrical or wind-powered generators, or any other form of devices that are capable of providing electrical power to system 100, system 100 may be separate from power source 102. As described above, numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to system 100.

System 100 includes power converter 104 which operates as a switch-based power converter that converts one form of electrical power provided by power source 102 into a different, and usable form, of electrical power for powering load 108. Power converter 104 may be a step-up converter that outputs power with a higher voltage level than the voltage level of input power received by the step-up converter. One example of such step-up converter may be referred to as a boost converter. Power converter 104 may instead comprise a step-down converter configured to output power with a lower voltage level than the voltage level of input power received by the step-down converter. One example of such a step-down converter may be referred to as a buck converter. In still other examples, power converter 104 may be a step-up and step-down converter (e.g., a buck-boost converter) that is capable of outputting power with a voltage level that is higher or lower level than the voltage level of the power input received by the step-up and step-down converter. Examples of power converter 104 may include battery chargers, microprocessor power supplies, and the like. Generally, the systems and methods described herein may be applied to single stage boost AC-to-DC converters. It will be understood, however, that power converter 104 may be a DC-to-DC converter, DC-to-AC converter or some type of AC-to-DC converter in addition to boost converters.

System 100 may further include filter 106 and load 108. Load 108 receives the electrical power (e.g., voltage, current, etc.) converted by power converter 104 after the power passes through filter 106. In some examples, load 108 uses the filtered electrical power from power converter 104 and filter 106 to perform a function. Numerous examples of filter 106 exist and may include, any suitable electronic filter for filtering power for a load. Examples of filter 106 include, but are not limited to, passive or active electronic filters, analog or digital filters, high-pass, low-pass, band pass, notch, or all-pass filters, resistor-capacitor filters, inductor-capacitor filters, resistor-inductor-capacitor filters, and the like. Likewise, numerous examples of load 108 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 102 may provide electrical power with a first voltage or current level over link 110. Load 108 may receive electrical power that has a second voltage or current level, converted by power converter 104, and filtered through filter 106, over link 114. Links 110, 112, and 114 represent any medium capable of conducting electrical power from one location to another. Examples of links 110, 112, and 114 include, but are not limited to, physical and/or wireless electrical transmission mediums such as electrical wires, electrical traces, conductive gas tubes, twisted wire pairs, and the like. Each of links 110 and 112 provide electrical coupling between, respectively, power source 102 and power converter 104, and power converter 104 and filter 106. Link 114 provides electrical coupling between filter 106 and load 108. In addition, link 114 provides a feedback loop or circuit for carrying information to power converter 104 associated with the characteristics of a filtered power output from filter 106.

In the example of system 100, electrical power delivered by power source 102 may be converted by power converter 104 to power that has a regulated voltage and/or current level that meets the power requirements of load 108. For instance, power source 102 may output, and power converter 104 may receive, power which has a first voltage level at link 110. Power converter 104 may convert the power which has the first voltage level to power which has a second voltage level that is required by load 108. Power converter 104 may output the power that has the second voltage level at link 112. Filter 106 may receive the power from power converter 104 and output the filtered power that has the second voltage level at link 114.

Load 108 may receive the filtered power that has the second voltage level at link 114. Load 108 may use the filtered power having the second voltage level to perform a function (e.g., power a microprocessor). Power converter 104 may receive information over link 114 associated with the filtered power that has the second voltage level. For instance, feedback control (e.g., current sensing) circuitry of power converter 104 may detect the voltage or current level of the filtered power output at link 114 and driver/control logic of power converter 104 may adjust the power output at link 112 based on the detected voltage or current level to cause the filtered power output to have a different voltage or current level that fits within a voltage or current level tolerance window required by load 108. In accordance with one or more aspects of this disclosure, digital control of a power converter may be exploited to improve efficiency, power factor, THD, or output stability. The operation of the power converter may be adjusted based on a wide range of parameter values, e.g. input voltage, output voltage, input current, output current, inductor current, input power, output power, input filter impedance, phase-angle of AC input and other parameter values to adjust AC current and AC voltage. For example some of these parameter values may be used to adjust AC input current and AC input voltage to be in phase or more closely in phased with each other to improve power factor because the best power factors are when AC current and AC voltage are exactly in phase with each other.

In some examples, power converter 104 may be a mixed-mode power converter 116. Mixed-mode power converter 116 may provide advantages compared to a single mode power converter, such as avoiding the large peak currents that may be produced in DCM. Mixed-mode power converter 116 may also use CRM at low loads to achieve a higher efficiency than can be obtained using CCM at low loads.

In some examples, mixed-mode power converter 116 may utilize interleaved power factor correction (PFC) in an attempt to achieve higher efficiency at all load conditions. In these examples, mixed-mode power converter 116 may include two identical boost converter circuits 118 connected in parallel together. During low load conditions, mixed-mode power converter 116 may activate a single boost converter 118 such that mixed-mode power converter 116 mimics a power converter operating in CRM. In the same examples, during high load conditions, mixed-mode power converter 116 may activate both boost converters 118. When both boost converters 118 are active, mixed-mode power converter 116 may keep the duty cycle of both switches a phase of 180 degrees apart. In these examples, the sum of both inductor currents may produce a continuous conduction current such that mixed-mode power converter 116 mimics a power converter operating in CRM.

In some examples, mixed-mode power converter 116 may include a single boost converter and a controller configured to change the conduction mode of the power converter. In these examples, mixed-mode power converter 116 may be advantageous because it may require fewer components and circuitry than an interleaved PFC, and may thus achieve lower costs. Another possible advantage of these examples may be that the controller does not have to manage the phase of two separate switches to make sure that they are always 180 degrees apart. Further, another possibly advantage is that the mixed-mode power converter 116 may be able to achieve a higher efficiency at low loads using CRM while still being capable of operating at higher power levels using CCM.

Figure 2:
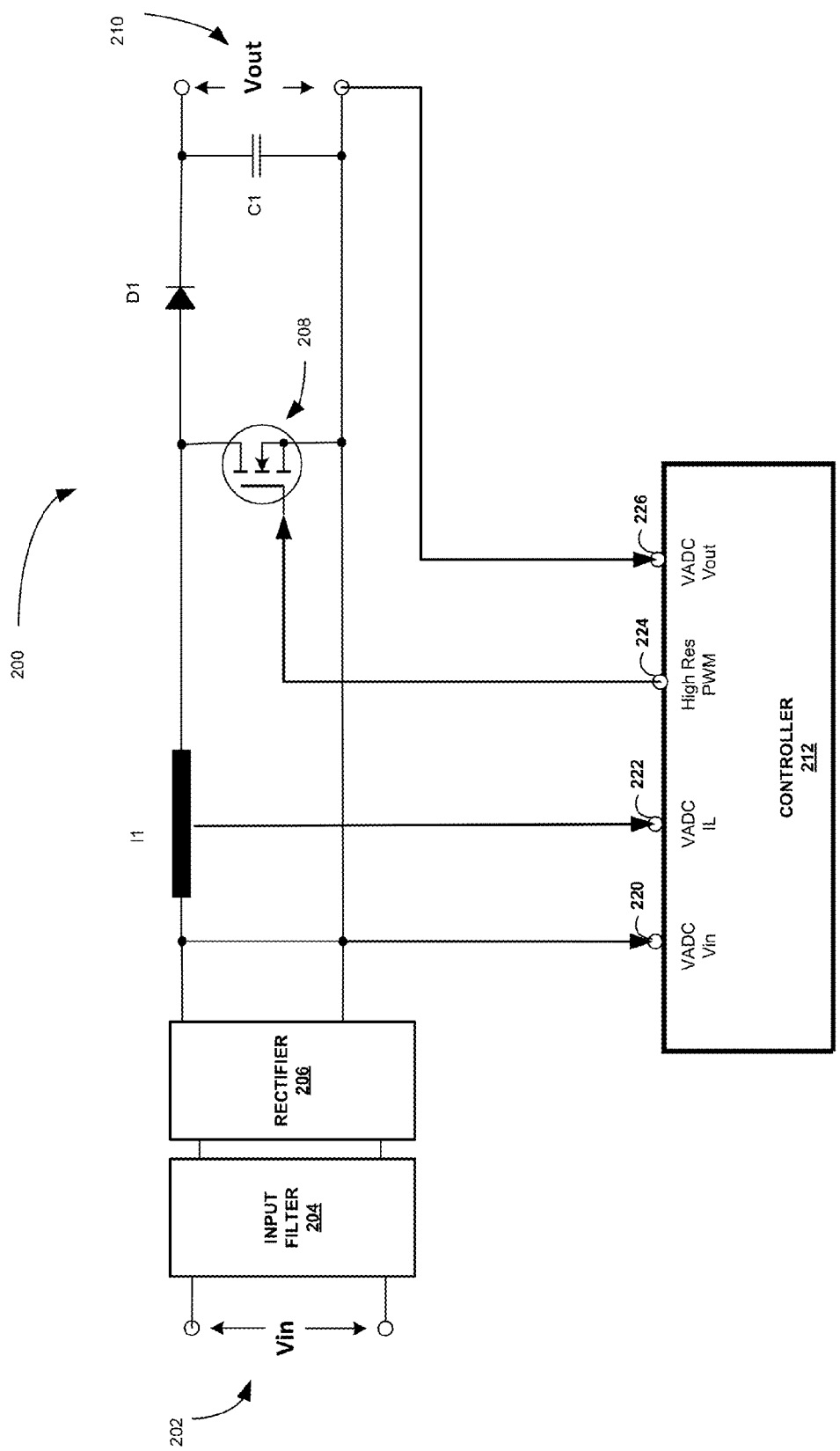
FIG. 2 is a block diagram illustrating an example power converter in accordance with one or more aspects of this disclosure.

FIG. 2 is a block diagram illustrating an example of a power converter 200 in accordance with one or more aspects of this disclosure. Power converter 200 may comprises a boost converter, however, it will be understood that aspects of this disclosure may be applied to other types of power converters. Power converter 200 may have an AC input 202 which may be filtered by input filter 204 and rectified from AC to DC by rectifier 206. Power converter 200 may include a switch, such as transistor 208. In some examples, transistor 208 may be a MOSFET, however other types of transistors may be used. When transistor 208 is closed, current may build up in inductor I1 and diode D1 may be reverse biased such that current does not flow through the diode D1.

Accordingly, capacitor C1 may supply energy to the load. When transistor 208 is open, diode D1 may be forward biased such that the only path for the inductor current to flow is through the diode D1, capacitor C1, and the load. In this state, energy from inductor I1 may recharge capacitor C1 and may supply the load.

As described above, in accordance with one or more aspects of this disclosure, digital control of a power converter may be exploited. This digital control may be provided, for example, by controller 212. In some examples, controller 212 may control power converter 200 by changing the conduction mode 214. Controller 212 may change conduction mode 214 by regulating transistor 208. In some examples, controller 212 may regulate transistor 208 based on a comparison of a parameter value 216 and a predefined value 218. Parameter value 216 may be based on input voltage 220, inductor current 222, and/or output voltage 226. Parameter value 216 may also be based on input current, output current, phase angle, or other parameter value related to the functioning of the power converter, such as operating temperature, frequency, and capacitance. In some examples, predefined value 218 may be a power value expressed in watts. In some examples, controller 212 may turn-on and turn-off transistor 208 to change the conduction mode based on the comparison.

In some examples, controller 212 may regulate transistor 208 by adjusting at least one output value. Controller 212 may output a pulse from a pulse width modulator (PWM) 224. In some examples, controller 212 may modulate the output pulse from PWM 224 based on comparing parameter value 216 to a predefined value 218.

Figure 3:
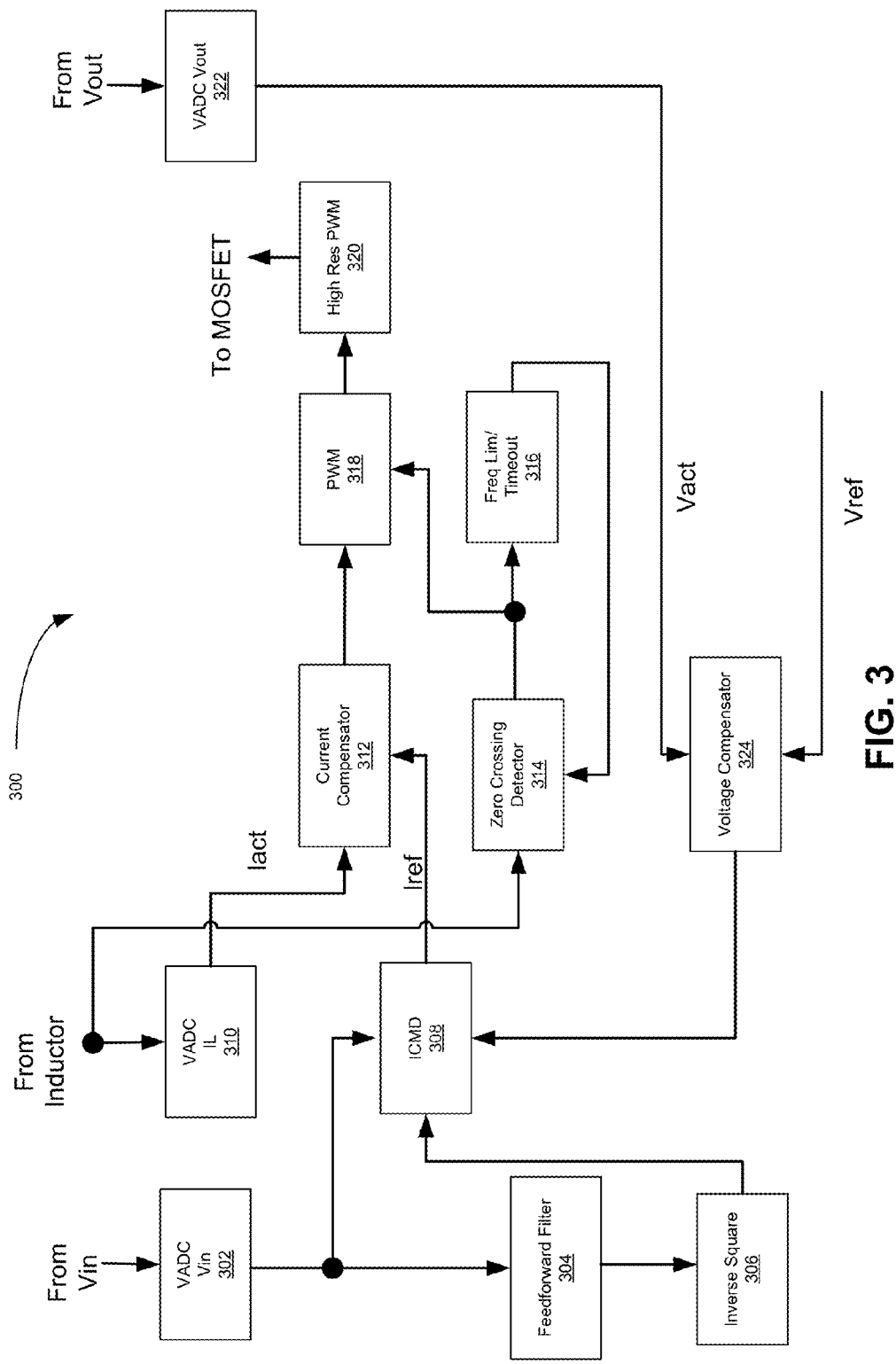
FIG. 3 is a block diagram illustrating an example controller of a power converter in accordance with one or more aspects of this disclosure.

FIG. 3 is a block diagram illustrating an example controller of a power converter in accordance with one or more aspects of this disclosure. As discussed above, controller 300 (212 in FIG. 2) may control the power converter by changing the conduction mode of the power converter. In some examples, controller 300 may change the conduction mode by adjusting the output to a transistor (208 in FIG. 2) based on a comparing parameter value 214 to a predefined value 218.

Controller 300 may include at least one input and at least one output. In some examples, the inputs to controller 300 may include input ADC voltage and current ($V_{ADC}$ $V_{in}$) 302, inductor current ($V_{ADC}$ IL) 310, and output voltage ($V_{ADC}$ $V_{out}$) 322. In some examples, controller 300 may output a pulse from a pulse width modulator 320 to turn-on and turn-of transistor 208.

The interaction between the inputs and outputs will be described more fully as they relate to the individual components of controller 300.

Controller 300 may include one or more pulse modulation devices, one or more current loops, a voltage loop, and one or more pulse modulation devices.

In some examples, controller 300 may change the conduction mode of power converter 200 by regulating the duty cycle of at least one pulse modulation device. Controller 300 may include at least one pulse width modulators (PWM), pulse density modulators (PDM), or pulse frequency modulator (PFM). In some examples, controller 300 may include a plurality of modulators. In the illustrated example, controller 300 includes two PWMs: PWM 318 and High Resolution PWM 320. In this example, PWM 318 provides an initial control of the pulse width and high resolution PWM 320 further refines the resolution of the PWM. In some examples, high resolution PWM 320 refines the output so that the waveshape more closely resembles the analog waveshape. In some examples, the duty cycles of PWMs 318 and 320 may depend upon the current loop and/or voltage loop.

Controller 300 may include one or more current loops. In some examples, one current loop may include input voltage and input current ($V_{ADC}$ $V_{in}$) 302, feedforward filter 304, inverse square 306, current command (ICMD) 308, and current compensator 312. ADC current may flow from $V_{ADC}$ $V_{in}$ 302 into feedforward filter 304. Feedforward filter 304 and inverse square 306 may be used to flatten the input voltage 302. Although power converter 200 converts the AC input voltage to a DC voltage via rectifier 206, the waveform of the DC input voltage still takes the form of a half-sinewave. Thus, feedforward filter 304 may delay a portion of the input signal and inverse square 306 may produce the root mean square (RMS) voltage to flatten the input DC voltage. After the current flows through feedforward filter 304 and inverse square 306, the resulting DC voltage may be used as current command (ICMD) 308. Current command 308 acts as a reference current $I_{ref}$. In some examples, current compensator 312 compares the reference current $I_{ref}$ to the actual inductor current $I_{act}$. By comparing the DC current $I_{ref}$ to the inductor current $I_{act}$, current compensator 312 may adjust the duty cycle of the least one PWM as the input voltage changes. In some examples, this type of current loop may be used when power converter 200 operates in continuous conduction mode (CCM). In some examples, when power converter 200 operates in CCM, the current loop may be regulated via software.

Controller 300 may include other current loops. In some examples, one current loop may include an inductor current $I_{act}$ and zero crossing detector (ZCD) 314. ZCD 314 may detect when the inductor current $I_{act}$ reaches zero, and may trigger the next PWM on-time. In some examples, this type of current loop may be used when power converter 200 operates in critical conduction mode (CRM).

In addition to the one or more current loops, in some examples, controller 300 may include a voltage compensator 324. In the illustrated example, voltage compensator 324 compares the output voltage ($V_{ADC}$ $V_{out}$) 322 to a reference voltage. In the illustrated example, the voltage compensator may adjust PWM 318 and high resolution PWM 320 to give a higher or lower duty cycle to respectively raise or lower the output voltage.

In some examples, the operation of the at least one pulse modulation device, the at least one current loop, and the voltage loop may be based on parameter value 326. In the illustrated example, controller 300 may be configured to determine parameter value 326 based on the inputs, such as the output power from power converter 200. For example, controller 300 may calculate the real power consumed by a load by measuring the output voltage and the inductor current, and multiplying the two values to obtain the output power. For example, if controller 300 measures the inductor current as 0.6 amperes and measures the output voltage as 400 volts, controller 300 may determine the output power by multiplying the current and voltage. In this example, controller 300 may determine the parameter value to be 240 watts.

In some examples, controller 300 may compare parameter value 326 to a predefined value 328. In some examples, controller 300 may change the conduction mode of controller 200 based on the comparison of the parameter value 326 and the predefined value 328. Based on the comparison, controller 300 may adjust the duty cycles of PWM 318 and 320 to turn-on and turn-off transistor 208, thus changing the conduction mode of controller 200.

Figure 4:
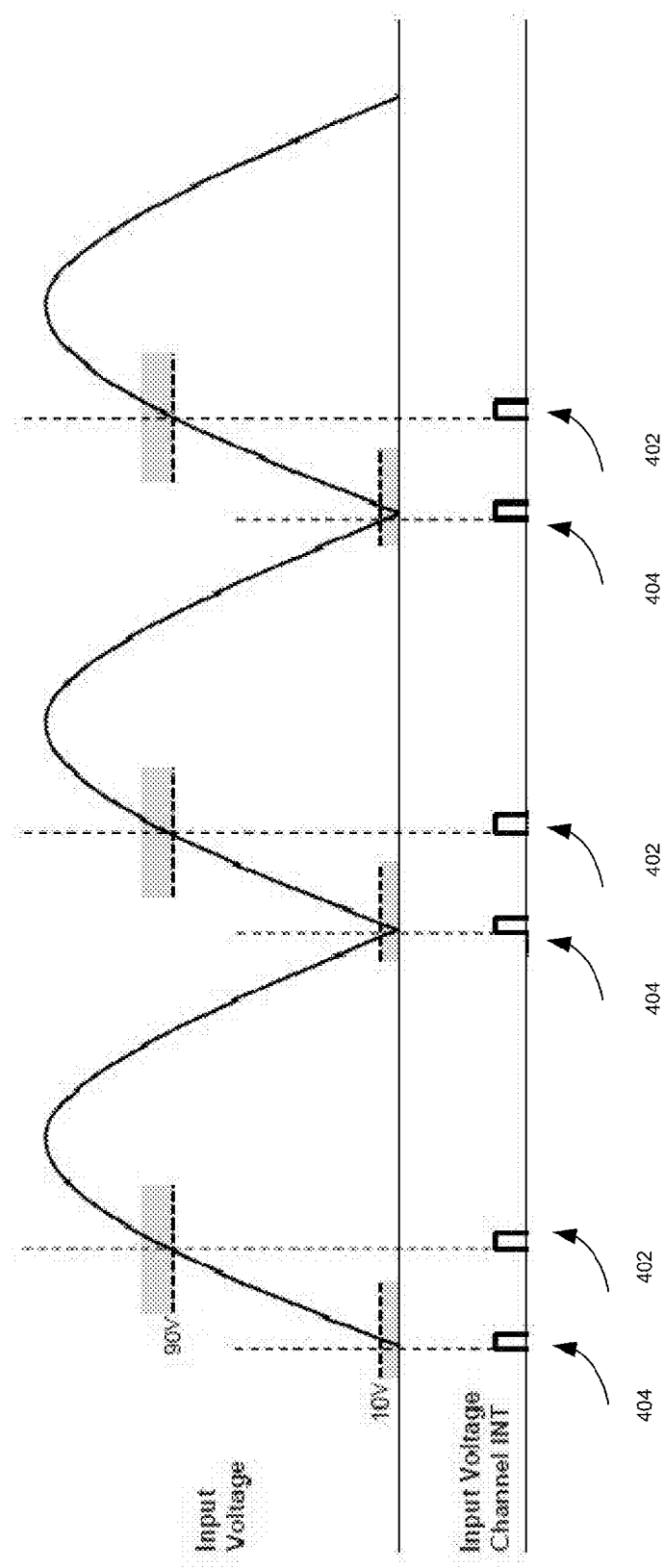
FIG. 4 is a graph that illustrates example waveforms for an input voltage.
Figure 5:
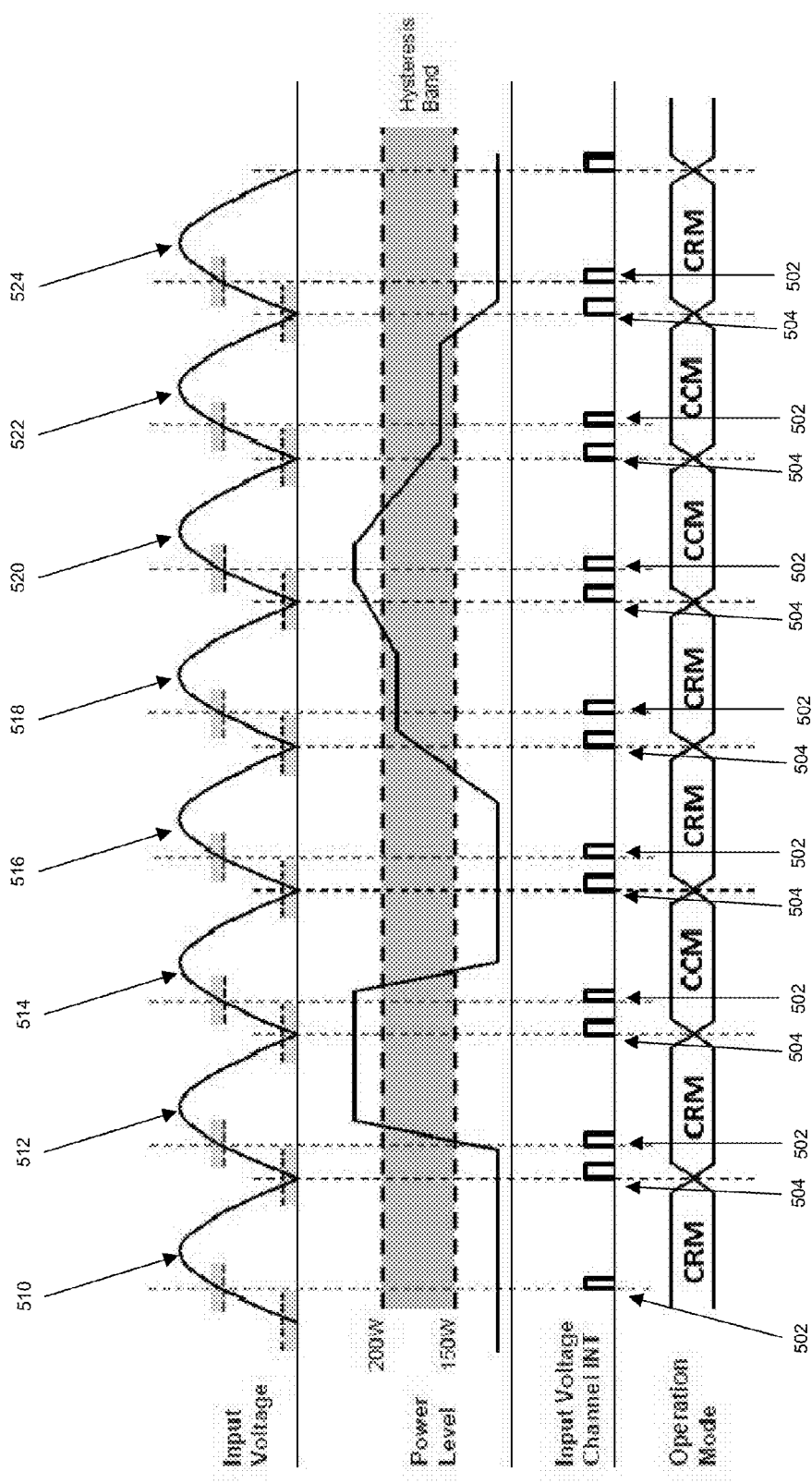
FIG. 5 is a graph that illustrates example waveforms for an input voltage and output power level.

FIGS. 4 and 5 are graphs that illustrate how controller 300 of FIG. 3 may determine the conduction mode that the power converter should use at different times.

FIG. 4 is a graph that illustrates example waveforms for an input voltage. In some examples, controller 300 of FIG. 3 may execute a plurality of input voltage channel interrupts at various input voltages. In the illustrated example of FIG. 4, a first interrupt 402 occurs when the input voltage reaches approximately 90 volts and a second interrupt 404 occurs when the input voltage reaches approximately 10 volts. In the illustrated example, controller 300 determines the power consumed by the load at first interrupt 402 and compares to a predefined value. In some examples, the predefined value may specify a power band for transitioning from one conduction mode to another conduction mode; the power band may include an upper value and a lower value. In the illustrated example, the predefined value is a power value, either approximately 150 watts or approximately 200 watts, depending upon whichever conduction mode power converter 200 is operating in at the time. In some examples, the predefined value may be higher or lower; for example, the power value may be between approximately 200 watts and approximately 300 watts when power converter 200 operates in one conduction mode and between approximately 100 watts and approximately 200 watts when power converter 200 operates in another conduction mode. In some examples, the predefined value may be any value between approximately 100 watts and 300 watts. In still other examples, the predefined value may be outside this range. In some examples, the predefined value may be preset by the user. In the illustrated example, controller 300 also determines the power consumed by the load at second interrupt 404 and compares to the predefined value. In other examples, the input voltage channel interrupts may occur at other input voltages, and that the predefined value may be any value appropriate for changing from one conduction mode to another.

FIG. 5 is a graph that illustrates example waveforms for an input voltage and an output power level. As shown in FIG. 4, in some examples, controller 300 of FIG. 3 may execute a plurality of voltage channel interrupts at various input voltages. In the illustrated example, as also shown in FIG. 4, a first interrupt 502 (element 402 as shown in FIG. 4) occurs when the input voltage reaches approximately 90 volts and a second interrupt 504 (element 404 as shown in FIG. 4) occurs when the input voltage reaches approximately 10 volts. Controller 300 may determine a parameter value, as discussed above, at the first input voltage channel interrupt 502. The controller 300 may then compare the parameter value to the predefined value. In the illustrated example, the parameter value may be the output power and the predefined value may be an output power level that depends upon which conduction mode power converter 200 is currently operating in. In some examples, the predefined value may be any output power value between approximately 100 watts and approximately 300 watts. In general, the predefined value is not limited to this range; it may be any value including values outside this range. In some examples, the predefined value may be 200 watts when power converter 200 operates in CRM and 150 watts when power converter 200 operates in CCM. In some examples, the predefined value may be preset by the user. In the illustrated example, when power converter 200 is operating in CRM, controller 300 will change the conduction mode to CCM when the output power exceeds approximately 200 watts. However, the controller executes a hysteresis band between approximately 150 and approximately 200 watts.

When power converter 200 is operating in CCM, the controller 300 will not change the conduction mode to CRM until the output power drops below approximately 150 watts. The hysteresis band prevents the conduction mode from changing modes frequently if the power changes small amounts around either predefined value.

In the illustrated example, during the first waveform cycle 510, power converter 200 operates in CRM because the output power level is less than approximately 150 watts. When the input voltage is approximately 90 volts, the controller 300 generates a first interrupt 502 to determine the output power. In this case, controller 300 determines that the output power is less than 150 watts. Controller 300 compares the output power to the predefined threshold value (in this case, 200 watts because the controller is operating in CRM) and controller 300 determines that power converter 200 will continue to operate in CRM. Controller 300 generates a second input voltage channel interrupt 504 when the input voltage reaches approximately 10 volts. In this case, output power is determined to be less than 150 watts. Controller 300 compares the output power to the predefined value (again, 200 watts because the controller is operating in CRM) and controller 300 determines that power converter 200 will continue to operate in CRM. Thus, in the illustrated example, controller 300 does not take any action to change the conduction mode at the second input voltage channel interrupt 504.

During the second input voltage cycle 512, controller 300 again determines the output power at a first input voltage channel interrupt 502, which occurs when the input voltage is approximately 90 volts. Controller 300 determines the input voltage is approximately 150 volts. Controller 300 compares the output power to a predefined value, in this case 200 watts because power converter 200 is operating in CRM. Since the output power does not exceed the predefined value, controller 300 does not take any action to change the conduction mode. However, controller 300 generates a second interrupt 504 when the input voltage drops to approximately 10 volts. In this case, the output power is determined to be in excess of 200 watts. Controller 300 compares the determined parameter value (output power) to the predefined value (again, 200 watts because the controller is operating in CRM). Because the output power is greater than the predefined value, controller 300 changes the conduction mode so that power converter 200 operates in CCM during the next cycle 514.

During the third input voltage cycle 514, power converter 200 now operates in CCM since controller 300 changed the conduction mode at the start of the third cycle 514. Controller 300 once again generates an interrupt 502 when the input voltage is approximately 90 volts and determines the output power. In this case, the output power is measured to be some value exceeding 200 watts. Controller 300 compares the output power to a predefined value (150 watts because power converter 200 is operating in CCM) and determines that power converter 200 should continue to operate in CCM. Controller 300 generates a second interrupt 504 when the input voltage drops to approximately 10 volts. Controller 300 again determines the output power; in this case, the output power is determined to be less than 150 watts. Controller 300 compares the output power to a predefined value (again, 150 watts when power converter 200 is operating in CCM). Because the output power is less than the predefined value when operating in CCM, the controller 300 changes the conduction mode so that power converter 200 operates in CRM during the next cycle 516.

Controller 300 may continue this process for all subsequent input voltage cycles. Controller 300 determines a parameter value (in the illustrated example the parameter value is the output power) at a first input voltage channel interrupt 502. Controller 300 then compares the parameter value to a predefined value. In the illustrated example, the predefined value is 200 watts when power converter 200 is operating in CRM, and the predefined value is 150 watts when power converter 200 is operating in CCM. If operating in CRM, controller 300 checks to see whether the parameter value is greater than 200 watts. In CRM, if the comparison shows that the parameter value is greater than the predefined value, controller 300 will change the conduction mode at the second interrupt 504. In CRM, if the comparison shows that the parameter value is equal to or less than the predefined value, controller 300 will not take any action to change the conduction mode. If operating in CCM, controller 300 checks to see whether the parameter value is less than 150 watts. In CCM, if the comparison shows that the parameter value is less than the predefined value, controller 300 will change the conduction mode at the second interrupt 504. In CCM, if the comparison shows that the parameter value is greater than or equal to the predefined value, controller 300 will not take any action to change the conduction mode. Although specific values of voltage and power are given above, other thresholds of power or voltage may be defined and used consistent with other examples of this disclosure.

If controller 300 determines that it will not change the conduction mode based upon the comparison of the parameter value and predefined value at the first interrupt 502, controller 300 again determines the parameter value (output power in the illustrated example) at a second interrupt 504 and compares to the predefined value. Controller 300 follows the same logic as described above in determining whether to change the conduction mode. If controller 300 determines that it needs to change the conduction mode based upon the comparison at the second interrupt 504, controller 300 proceeds to immediately change the conduction mode before starting the next cycle.

For purposes of illustration only, the predefined value in FIG. 5 is a power level and is set at 200 watts when power converter 200 operates in CRM and 150 watts when power converter 200 operates in CCM. In some examples, when the predefined value is a power level the value may be any wattage between approximately 100 watts and approximately 300 watts. However, in general, the predefined value may be any value and is not limited to values inside this range.

Figure 6:
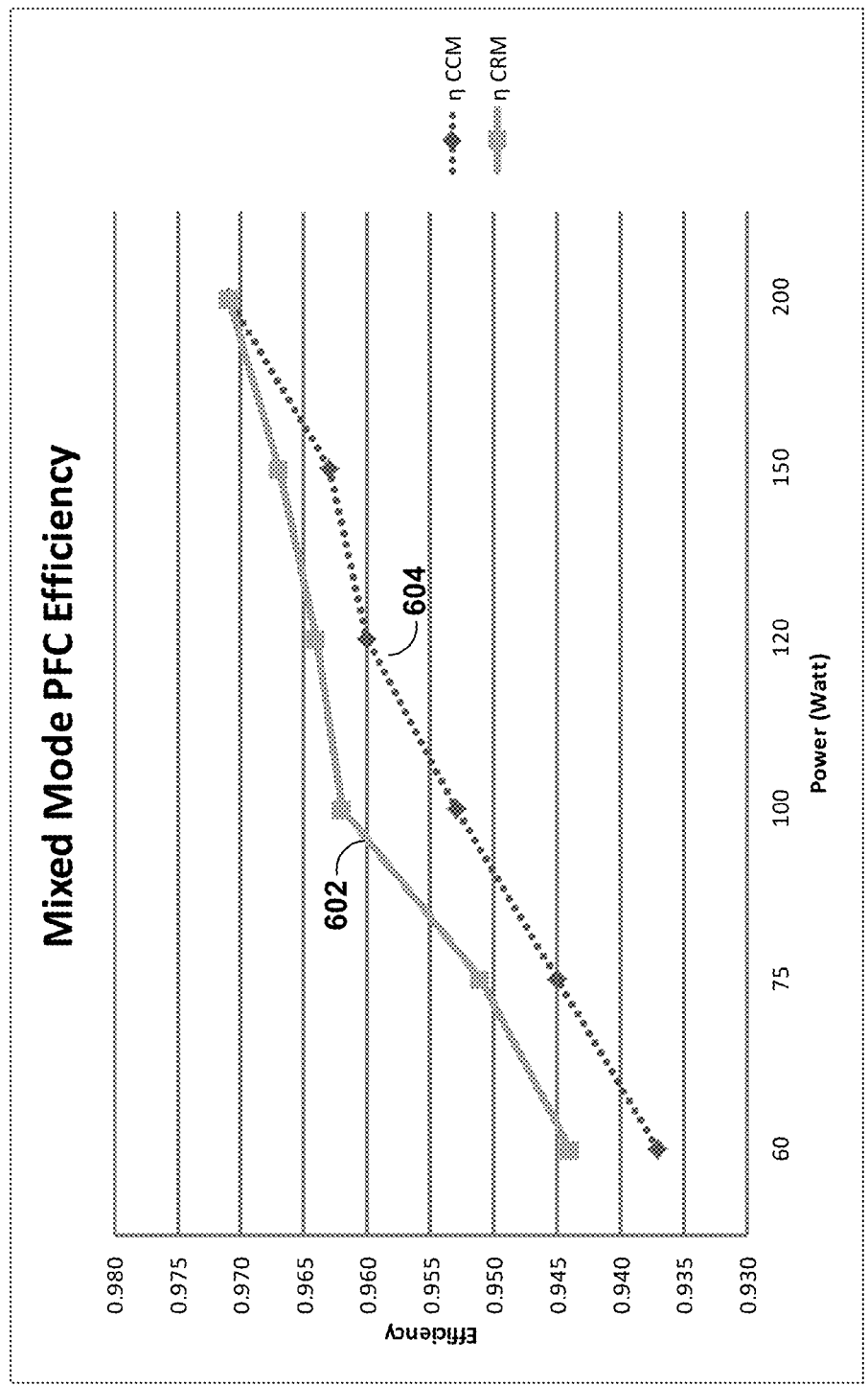
FIG. 6 is a graph illustrating measurement results of the efficiency of the power converter operating in various conduction modes in an example implantation, in accordance with one or more aspect of this disclosure.
Figure 7:
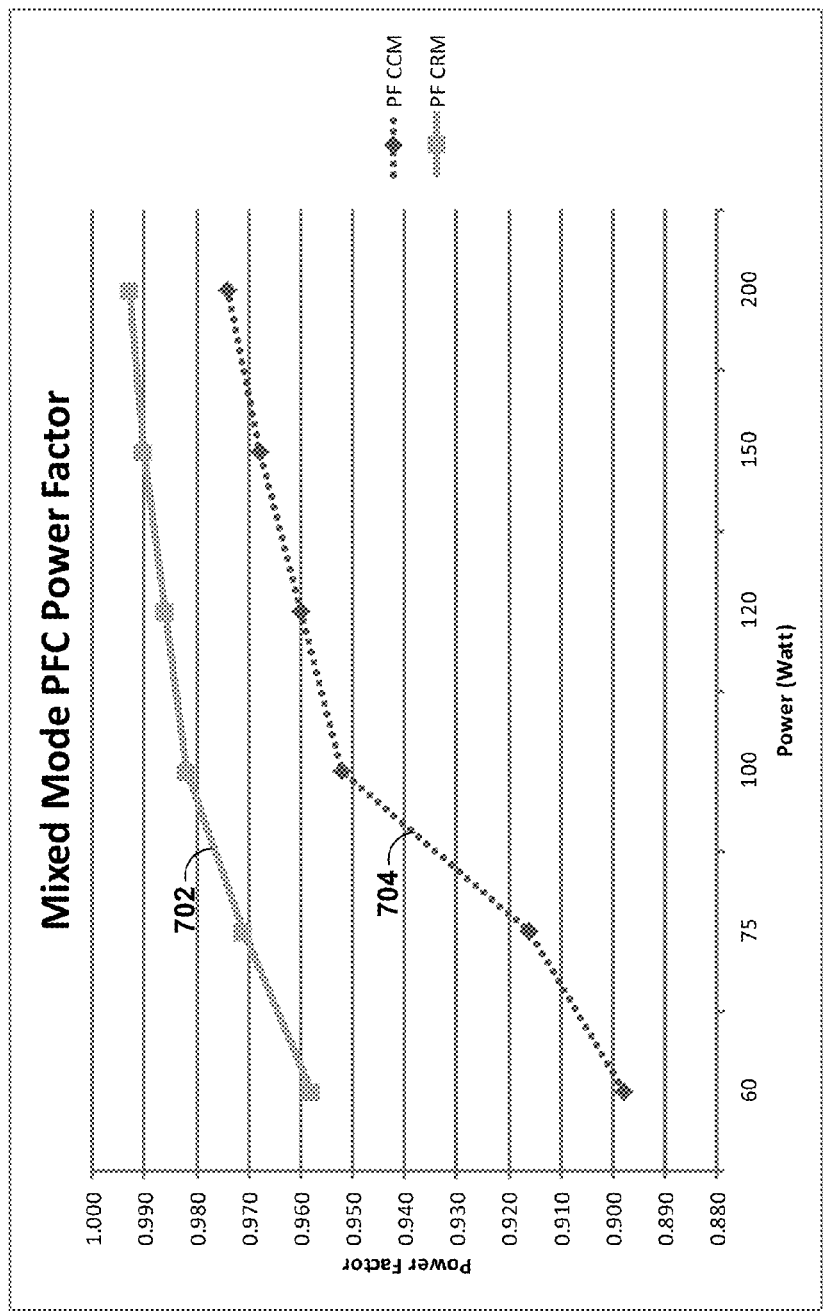
FIG. 7 is a graph illustrating measurement results of the power factor of the power converter operating in various conduction modes in an example implementation, in accordance with one or more aspects of this disclosure.
Figure 8:
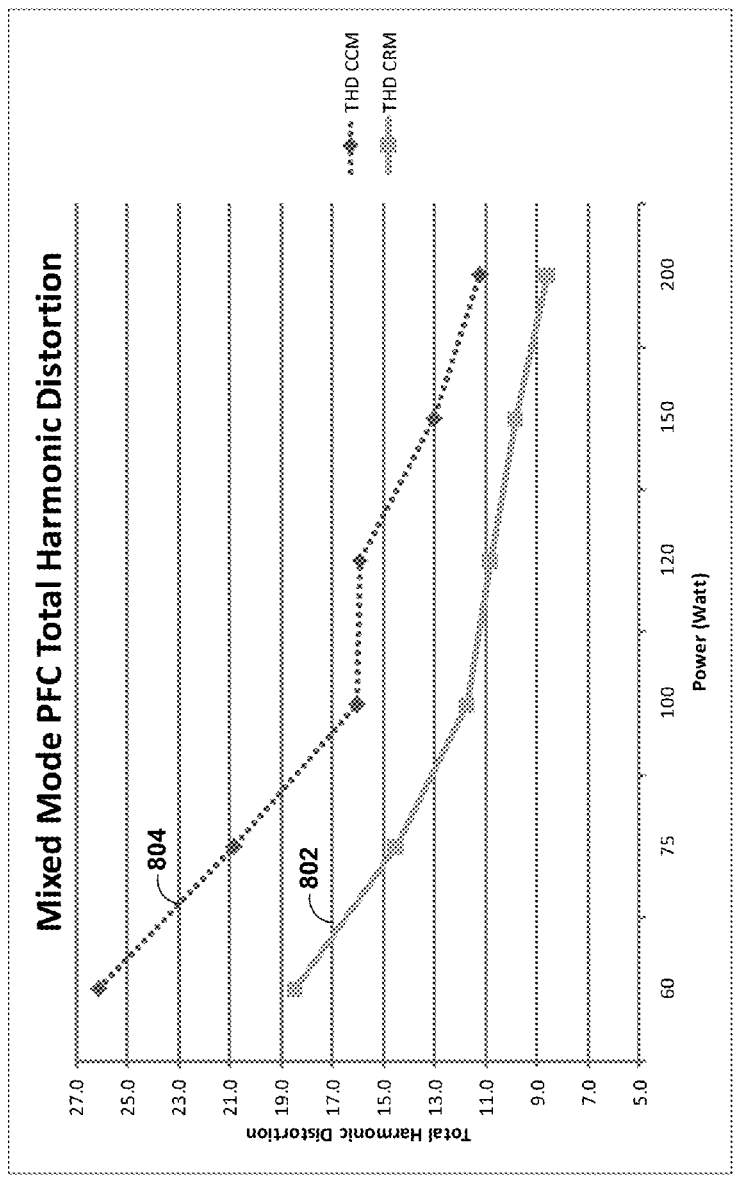
FIG. 8 is a graph illustrating measurement results of the total harmonic distortion of the power converter operating in various conduction modes in an example implementation, in accordance with one or more aspects of this disclosure.

FIGS. 6-8 are graphs that help illustrate the benefits of using CRM over CCM at low power levels.

FIG. 6 is a graph illustrating measurement results of the efficiency of the power converter operating in various conduction modes in an example implantation, in accordance with one or more aspects of this disclosure. As illustrated, power converters operating in critical conduction mode (CRM) are more efficient than power converters operating in continuous conduction mode (CCM) up to approximately 200 watts. For example, at 60 watts, the CRM efficiency 602 is approximately 94.5%, while the CCM efficiency 604 is approximately 93.5%. CRM remains more efficient until about 200 watts, at which point CRM efficiency 602 and CCM efficiency 604 are approximately equal.

FIG. 7 is a graph illustrating measurement results of the power factor of the power converter operating in various conduction modes in an example implementation, in accordance with one or more aspects of this disclosure. As illustrated, at low power levels, power converters operating in CRM achieve a higher power factor than power converters operating in CCM. For example, at 60 watts, the CRM power factor 702 is approximately 0.96, while the CCM power factor 704 is approximately 0.90. CRM power factor 702 remains higher than the CCM power factor 704, even at 200 watts.

FIG. 8 is a graph illustrating measurement results of the total harmonic distortion (THD) of the power converter operating in various conduction modes in an example implementation, in accordance with one or more aspects of this disclosure. As illustrated, at low power levels, power converters operating in CRM achieve lower THD than power converters operating in CCM. For example, at 60 watts, CRM THD 802 is approximately 18.5, while the CCM THD 804 is approximately 26.0. CRM THD 802 remains lower than the CCM THD 804, even at 200 watts.

Referring to FIGS. 6-8, several key statistics show that CRM may be the preferred conduction mode at low power. At approximately 200 watts, CCM begins to have better efficiency compared to CRM, indicating that it may be more desirable to change from CRM to CCM at approximately 200 watts.

Figure 9:
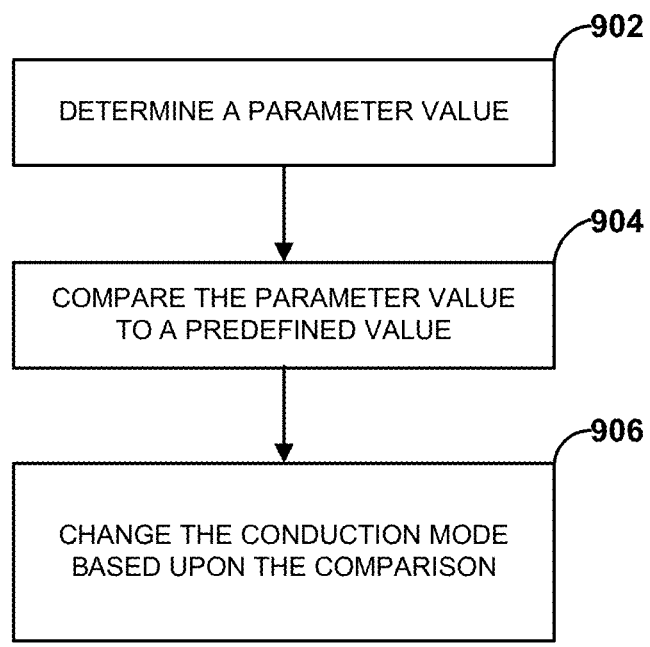
FIG. 9 is a flowchart illustrating an example method for operations of an example power converter, in accordance with one or more aspects of this disclosure.

FIG. 9 is a flowchart illustrating an example method for operations of an example power converter, in accordance with one or more aspects of this disclosure.

In some examples, controller 212 of FIG. 2 may be configured to determine a parameter value (902). The parameter value may include one of input voltage, output voltage, input current, output current, inductor current, phase angle, or other parameter value related to the functioning of the power converter, operating temperature, frequency, or capacitance. Accordingly, power converter 200 may include circuitry to measure one or more of input voltage, output voltage, input current, output current, inductor current, input power, output power, phase angle, operating temperature, frequency, capacitance, or other parameter values (not shown).

In some examples, controller 212 may be further configured to compare the parameter value to a predefined value (904). In some examples, the predefined value may be an output power, inductor current, output voltage or other predefined value. The predefined value may depend on the operation of power converter 200. For example, the predefined value may be power (in watts) in certain conduction modes; but in other conduction modes, the predefined value may be an amount of current or voltage. In some examples, the predefined value may be a single data type (i.e., power in watts), but the level may vary depending on the conduction mode of power converter 200. For example, the predefined value may be an amount of power; in these examples the predefined value may be any value between approximately 100 watts and 300 watts. In some examples, when power converter 200 operates in CRM the predefined value may be 200 watts, but when power converter 200 operates in CCM the predefined value may be 150 watts.

Controller 212 may perform a comparison of the parameter value (e.g., measured output power) and the predefined value (output power) (904). In some examples, comparison (906) may depend upon the conduction mode of power converter 200. For example, when power converter 200 operates in CRM, controller 212 may determine whether the parameter value is greater than the predefined value. However, when power converter 200 operates in CCM, controller 212 may determine whether the parameter value is less than the predefined value.

As shown in FIG. 9, after the comparison of the parameter value and predefined value (904), controller 212 may be configured to change between a first conduction mode and a second conduction mode based upon the comparison (906).

In some examples, when power converter 200 operates in CRM, controller 212 may compare the parameter value to the predefined value (904) to determine whether the parameter value is greater than predefined value. If the parameter value is greater than the predefined value, controller 212 may change the conduction mode from CRM to CCM (906).

In some examples, when power converter 200 operates in CCM, controller 212 may compare the parameter value to the predefined value (904) to determine whether parameter value 902 is less than predefined value 904. If the parameter value is less than the predefined value, controller 212 may change the conduction mode from CCM to CRM (906).

For example, assume power converter 200 is operating in CRM and that controller 212 determines the parameter value (e.g., measured output power) to be 220 watts (902). In this example, the predefined value is 200 watts because power converter 200 is operating in CRM. Controller 212 compares the parameter value (220 watts) to the predefined value (200 watts) (904) and determines that the parameter value is greater than the predefined value. Thus, controller 212 changes the conduction mode from CRM to CCM (906).

In another example, assume power converter 200 is operating in CCM and that controller 212 determines the parameter value (e.g., measured output power) to be 120 watts (902). In this example, the predefined value is 150 watts because power converter 200 is operating in CCM. Controller 212 compares the parameter value (120 watts) to the predefined value 904 (150 watts) (904) and determines that the parameter value is less than the predefined value. Thus, controller 212 changes the conduction mode from CCM to CRM (906).

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A controller for controlling a power converter, wherein the controller is configured to:
while operating the power converter in a first conduction mode:
determine whether a first value of an electrical signal received by the power converter is greater than or equal to a first threshold value;
in response to determining that the first value of the electrical signal received by the power converter is greater than or equal to the first threshold value, generate a first voltage interrupt and determine a first value of an electrical signal output by the power converter;
compare the first value of the electrical signal output by the power converter to a first predefined value; and
in response to determining that the first value of the electrical signal output by the power converter is greater than or equal to the first predefined value and that a second value of the electrical signal received by the power converter is less than or equal to a second threshold value, generate a second voltage interrupt and change from the first conduction mode to a second conduction mode; and
while operating the power converter in the second conduction mode:
determine whether a third value of the electrical signal received by the power converter is greater than or equal to the first threshold value;
in response to determining that the third value of the electrical signal received by the power converter is greater than or equal to the first threshold value, generate a third voltage interrupt and determine a second value of the electrical signal output by the power converter;
compare the second value of the electrical signal output by the power converter to a second predefined value that is less than the first predefined value; and
in response to determining that the second value of the electrical signal output by the power converter is less than or equal to the second predefined value and that a fourth value of the electrical signal received by the power converter is less than or equal to the second threshold value, generate a fourth voltage interrupt and change from the second conduction mode to the first conduction mode.

2. The controller of claim 1, wherein the first threshold value is greater than the second threshold value.

3. The controller of claim 1, wherein the controller is further configured to, while operating the power converter in the second conduction mode:
detect, with a zero crossing detector, an inductor current; and
cause a pulse modulation device to turn-on when the inductor current reaches zero, wherein the electrical signal received by the power converter comprises an input voltage.

4. The controller of claim 3, wherein the controller is further configured to, while operating the power converter in the first conduction mode:
determine a root-mean-square of the input voltage;
determine, based on the root-mean-square of the input voltage, a reference current; and
determine, based on the reference current and the inductor current, a duty cycle of the pulse modulation device.

5. The controller of claim 1, further comprising:
a first pulse width modulator configured to generate a pulse modulated signal defined by a first resolution; and
a second pulse width modulator configured to:
refine the pulse modulated signal from the first resolution to a second resolution; and
output the pulse modulated signal defined by the second resolution,
wherein the pulse modulated signal defined by the second resolution modulates a switch of the power converter, wherein modulation of the switch changes the conduction mode of the power converter.

6. The controller of claim 5, further comprising at least one voltage compensator and at least one current compensator, wherein the controller is configured to modulate a duty cycle of at least one of the first pulse width modulator or the second pulse width modulator based at least in part on the at least one voltage compensator and the at least one current compensator.

7. The controller of claim 1, wherein the electrical signal output by the power converter comprises one of an output voltage, an output current, an output power, or a phase angle.

8. The controller of claim 1, wherein the first predefined value is a first threshold amount of power and the second predefined value is a second threshold amount of power.

9. The controller of claim 8,
wherein the first conduction mode is a critical conduction mode,
wherein the first predefined value is between 200 watts and 300 watts,
wherein the second conduction mode is a continuous conduction mode, and
wherein the second predefined value is between 100 watts and 200 watts.

10. A method of controlling a power converter, the method comprising:
while operating the power converter in a first conduction mode:
determining whether a first value of an electrical signal received by the power converter is greater than or equal to a first threshold value;
in response to determining that the first value of the electrical signal received by the power converter is greater than or equal to the first threshold value, generating a first voltage interrupt and determining a first value of an electrical signal output by the power converter;
comparing the first value of an electrical signal output by the power converter to a first predefined value; and
in response to determining that the first value of an electrical signal output by the power converter is greater than or equal to the first predefined value and that a second value of the electrical signal received by the power converter is less than or equal to a second threshold value, generating a second voltage interrupt and changing from the first conduction mode to a second conduction mode; and
while operating the power converter in the second conduction mode:
determining whether a third value of the electrical signal received by the power converter is greater than or equal to the first threshold value;
in response to determining that the third value of the electrical signal received by the power converter is greater than or equal to the first threshold value, generating a third voltage interrupt and determining a second value of the electrical signal output by the power converter;
comparing the second value of the electrical signal output by the power converter to a second predefined value that is less than the first predefined value; and
in response to determining that the second value of the electrical signal output by the power converter is less than or equal to the second predefined value and that a fourth value of the electrical signal received by the power converter is less than or equal to the second threshold value, generating a fourth voltage interrupt and changing from the second conduction mode to the first conduction mode.

11. The method of claim 10, further comprising:
generating, by a first pulse width modulator, a pulse modulated signal defined by a first resolution;
refining, by the second pulse width modulator, the pulse modulated signal from the first resolution to a second resolution; and
outputting, by the second pulse width modulator, the pulse modulated signal defined by the second resolution,
wherein the pulse modulated signal defined by the second resolution modulates a switch of the power converter, and
wherein the modulation of the switch changes the conduction mode of the power converter.

12. The method of claim 11, further comprising modulating a duty cycle of at least one of the first pulse width or the second pulse width modulator based at least in part on at least one voltage compensator and at least one current compensator.

13. The method of claim 10, wherein the electrical signal output by the power converter comprises one of an output voltage, an output current, an output power, or a phase angle.

14. The method of claim 10, wherein the first predefined value is a first threshold amount of power and the second predefined value is a second threshold amount of power.

15. The method of claim 14,
wherein the first conduction mode is a critical conduction mode,
wherein the first predefined value is between 200 watts and 300 watts,
wherein the second conduction mode is a continuous conduction mode, and
wherein the second predefined value is between approximately 100 watts and approximately 200 watts while the controller operates in the continuous conduction mode.

16. A system comprising:
a power converter that includes a switch; and
a controller for controlling the power converter, wherein the controller is configured to:
while operating the power converter in a first conduction mode:
determine whether a first value of an electrical signal received by the power converter is greater than or equal to a first threshold value;
in response to determining that the first value of the electrical signal received by the power converter is greater than or equal to the first threshold value, generate a first voltage interrupt and determine a first value of an electrical signal output by the power converter;
compare the first value of the electrical signal output by the power converter to a first predefined value; and
in response to determining that the first value of the electrical signal output by the power converter is greater than or equal to the first predefined value and that a second value of the electrical signal received by the power converter is less than or equal to a second threshold value, generate a second voltage interrupt and change from the first conduction mode to a second conduction mode; and
while operating the power converter in the second conduction mode:
determine whether a third value of the electrical signal received by the power converter is greater than or equal to the first threshold value;
in response to determining that the third value of the electrical signal received by the power converter is greater than or equal to the first threshold value, generate a third voltage interrupt and determine a second value of the electrical signal output by the power converter;
compare the second value of the electrical signal output by the power converter to a second predefined value that is less than the first predefined value; and in response to determining that the second value of the electrical signal output by the power converter is less than or equal to the second predefined value and that a fourth value of the electrical signal received by the power converter is less than or equal to the second threshold value, generate a fourth voltage interrupt and change from the second conduction mode to the first conduction mode.

17. The system of claim 16, further comprising:
a first pulse width modulator configured to generate a pulse modulated signal defined by a first resolution; and
a second pulse width modulator configured to:
  refine the pulse modulated signal from the first resolution to a second resolution; and
  output the refined pulse modulated signal defined by the second resolution,
wherein the pulse modulated signal defined by the second resolution modulates the switch of the power converter, wherein the modulation of the switch changes the conduction mode of the power converter.

18. The system of claim 17, further comprising at least one voltage compensator and at least one current compensator, wherein the controller is configured to modulate a duty cycle of at least one of the first pulse width modulator or the second pulse width modulator based at least in part on the at least one voltage compensator and the at least one current compensator.

19. The system of claim 16, wherein the electrical signal output by the power converter comprises one of an output voltage, an output current, an output power, or a phase angle.

20. The system of claim 16,
  wherein the first conduction mode is a critical conduction mode,
  wherein the first predefined value is between 200 watts and 300 watts,
  wherein the second conduction mode is a continuous conduction mode, and
  wherein the second predefined value is between 100 watts and 200 watts.

* * * * *